P. C. ROUSSET.
Deep Sea Sounding Apparatus.

No. 230,661. Patented Aug. 3, 1880.

Witnesses:
Carl Karp
Otto Pusch

Inventor:
Paul Carl Rousset
by Paul Goepel
Attorney

UNITED STATES PATENT OFFICE.

PAUL CARL ROUSSET, OF ST. PETERSBURG, RUSSIA.

DEEP-SEA-SOUNDING APPARATUS.

SPECIFICATION forming part of Letters Patent No. 230,661, dated August 3, 1880.

Application filed October 31, 1879.

*To all whom it may concern:*

Be it known that I, PAUL CARL ROUSSET, of the city of St. Petersburg, in the Empire of Russia, have invented a new and Improved Sounding Apparatus, of which the following is a specification.

Figure 1:
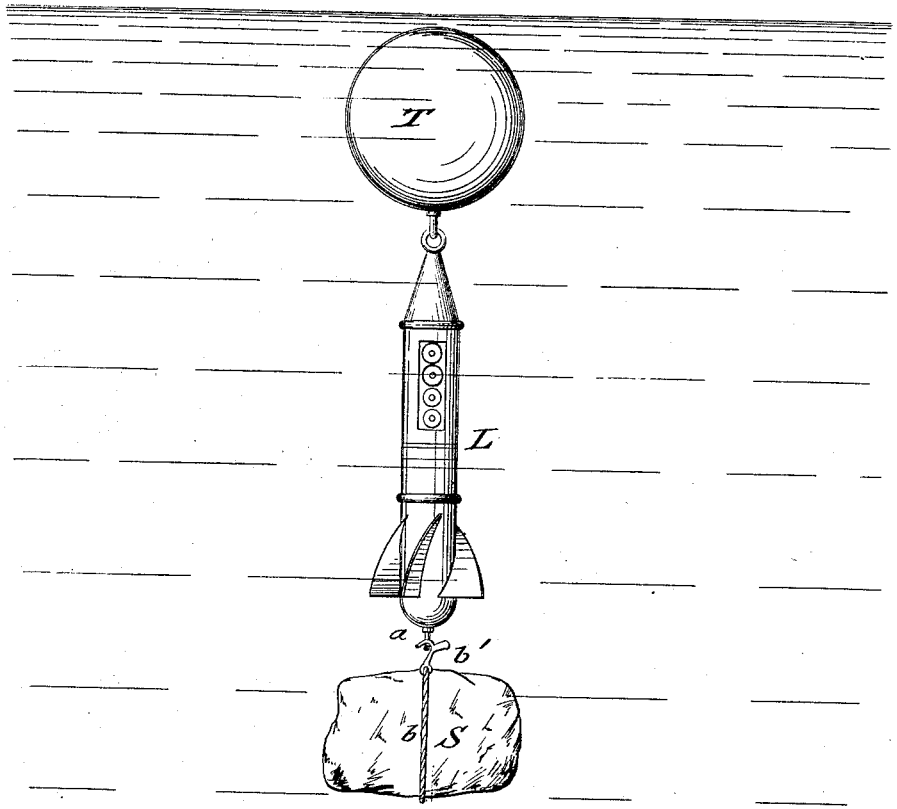
Figure 2:
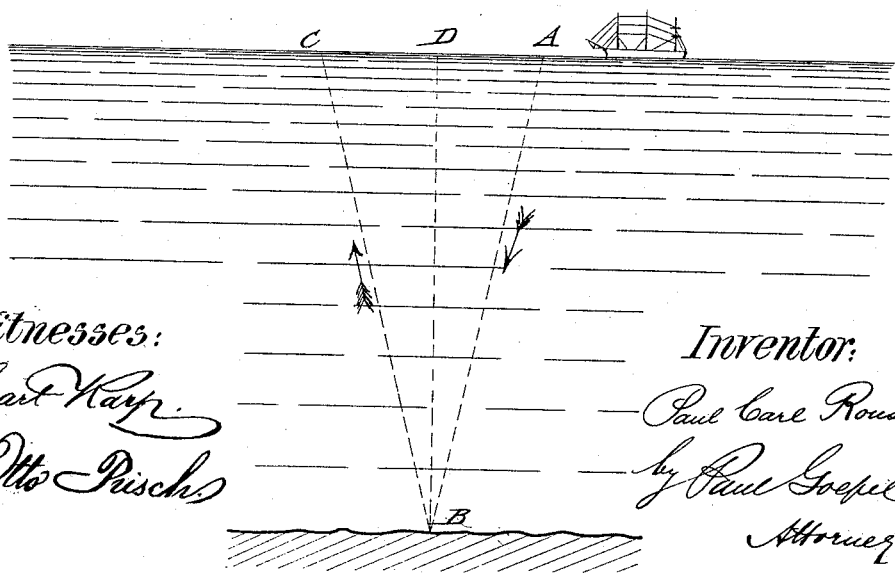

In the accompanying drawings, Figure 1 represents a side elevation of my improved sounding apparatus, and Fig. 2 a diagram, showing method of sinking the device in deep water having a current.

The object of this invention is to furnish for deep-sea soundings an improved apparatus by which the sounding line or wire may be entirely dispensed with and the depth ascertained in more accurate manner, as the irregularities caused by the length of the line in great depths are avoided.

The invention consists of an improved device for connecting the sinker of a sounding device with the registering-log thereof; and it further consists in the combination of parts hereinafter described, and pointed out in the claims.

Referring to the drawings, T represents a spherical or other float of suitable size, from which a so-called "patent log," L, is suspended, either by a ring or other connection, or secured rigidly thereto, as desired. Any approved construction of registering-log may be employed in which a propelling-screw operates by suitable transmitting mechanism a registering device connected therewith.

The registering device of the log L is provided with a ratchet and pawl that locks the registering mechanism during the descent of the log, but throws it instantly into operation on the ascent of the same. To a ring, $a$, at the lower part of the log L, below the actuating-screw, is suspended the sinker S, by means of a wire or other fastening, $b$, and a hook, $b'$. The hook $b'$ is weighted and of such shape as to be instantly released from the log when the sinker S strikes bottom.

This connecting device may be used with any form of sinker, and by reason of its slight cost and ready automatic detachment from the registering device it will be found to be much superior to the connecting devices ordinarily used for this purpose.

The center of gravity of the log should be at as low a point as possible, so that the perpendicular position of the log is retained during its upward motion. This upward motion takes place at the instant when the sinker is detached from the log on striking bottom, as the float causes then the rapid ascent of the log through the water. As the log acts only during the upward motion the registering mechanism indicates accurately the depth reached when the float arrives at the surface, where it is fished up by the crew of the sounding-vessel.

The sounding apparatus may also be employed for ascertaining the depth of water having a current. If the log is lowered at the point A, Fig. 2, it descends, owing to the current, in the direction of the line A B, and rises on the line B C. By measuring the distance between A and C—namely, from the point where the log has been lowered to the point where it makes its appearance—the real depth B D can be accurately computed trigonometrically.

A vessel fitted out with a number of such sounding devices can accomplish the measurement of great depths with greater facility, cheapness, accuracy, and dispatch than with the various deep-sea-sounding apparatus at present in use.

I do not claim, broadly, the combination, in a sounding apparatus, of a float, a measuring-instrument revolved by blades, and a detachable weight; but

I claim—

The combination of the float T, the log L, provided with blades and registering mechanism, and with a ring, $a$, at the lower end, and a sinker, S, and a hook, $b'$, adapted to be tied to the sinker by a cord or wire and having a laterally-projecting arm, all constructed as set forth.

In testimony whereof I have signed my name to this specification in the presence of two subscribing witnesses.

PAUL CARL ROUSSET.

Witnesses:
 WOLDEMAR SAENGER,
 W. H. EDWARDS.